Figure 1:
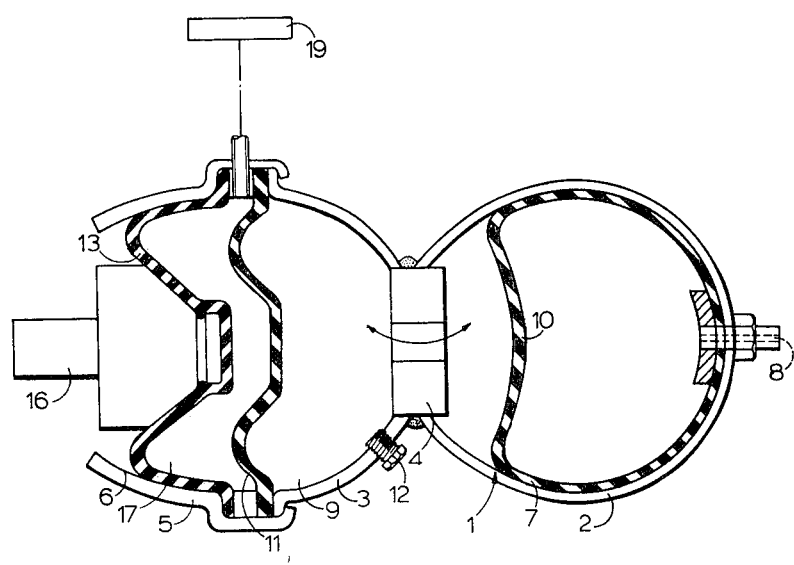

United States Patent [19]

Taft

[11] 4,273,358
[45] Jun. 16, 1981

[54] SUSPENSION MEANS FOR VEHICLES

[75] Inventor: Phillip A. Taft, Solihull, England

[73] Assignee: Girling Limited, Birmingham, England

[21] Appl. No.: 25,862

[22] Filed: Apr. 2, 1979

[51] Int. Cl.³ .............................................. B60G 11/30
[52] U.S. Cl. .................................. 280/708; 267/64 R; 280/714
[58] Field of Search ................................ 280/702–709, 280/711, 714; 267/DIG. 1, DIG. 2, 64 R, 64 B, 65 D; 188/298

[56] References Cited

U.S. PATENT DOCUMENTS

| 2,843,396 | 7/1958 | Lucien | 280/708 |
| 3,032,350 | 5/1962 | Ruhl et al. | 280/708 |
| 3,033,552 | 5/1962 | Ogden | 280/708 X |
| 3,395,931 | 8/1968 | Piret | 280/705 |
| 3,424,449 | 1/1969 | Strifler | 267/64 R |
| 3,884,496 | 5/1975 | Ito et al. | 267/64 R |
| 4,049,251 | 9/1977 | Masae | 280/708 X |
| 4,212,484 | 7/1980 | Fujii | 280/708 X |

Primary Examiner—John J. Love
Assistant Examiner—Norman L. Stack
Attorney, Agent, or Firm—Scrivener, Clarke, Scrivener and Johnson

[57] ABSTRACT

An hydro-pneumatic suspension device comprises a pressure chamber and a working chamber which are separated from each other by a first diaphragm. The pressure chamber contains a trapped volume of gas under pressure for supporting the load on a wheel or axle, the working chamber contains a volume of liquid under pressure which is trapped between the first diaphragm, and oppositely acting one-way valves or restrictors are provided for damping liquid flow in the working chamber. The side of the second diaphragm remote from the working chamber is subjected to a supply of liquid of which the pressure can be altered to compensate for changes in pressure in the pressure chamber due to changes in the loading on a vehicle.

5 Claims, 2 Drawing Figures

SUSPENSION MEANS FOR VEHICLES

This invention relates to improvements in hydro-pneumatic suspension means for vehicles comprising a pressure chamber and a working chamber which are separated from each other by means of a first flexible diaphragm, the pressure chamber containing a trapped volume of gas under pressure which defines a gas spring for supporting the load on a wheel or axle, and the working chamber containing a trapped volume of liquid under pressure, and damping valve means through which the liquid is forced to damp out oscillations of the gas spring in response to relative movement between the wheel or axle and the frame or chassis of the vehicle between which relatively movable parts of the suspension means are adapted to be connected.

In hydro-pneumatic suspension means of the kind set forth increase in the loading on the vehicle compresses the gas in the pressure chamber thereby reducing the effective volume of the pressure chamber and the effective distance between the connections with the relatively movable parts. This, in consequence, reduces the ride height of the vehicle. Similarly, decrease in the loading permits the effective distance between the connections to increase, thereby increasing the ride height of the vehicle.

It is desirable, and in some countries obligatory, for the ride height of vehicles to be maintained at values such that the height of the bumpers, front and rear and suitably of the "impact resistant" type, correspond to and are maintained at a constant value irrespective of whether a vehicle is loaded or unloaded. This has the aim of preventing low-speed collisions from impairing the safe operations of vehicle systems and of reducing the frequency of "over-ride" or "under-ride" in higher speed collisions.

According to our invention in an hydro-pneumatic suspension means of the kind set forth the volume of liquid in the working chamber is trapped between the first diaphragm and a second diaphragm which is subjected on its opposite side remote from the working chamber to a supply of liquid of which the pressure can be altered to compensate for changes in the pressure in the pressure chamber due to changes in the loading on the vehicle, whereby the ride height can be maintained substantially at a constant value.

Since the second diaphragm is substantially leak-proof, there will be no tendency for the liquid pressure to leak, for example back to a reservoir, under conditions when the pressure of the supply liquid is maintained at a constant value, for example when the prime mover of the vehicle and, in consequence, a high pressure pump which it drives, is switched off. Thus the ride height can be maintained substantially at the constant value, irrespective of the loading on the vehicle and irrespective of whether the prime mover is switched on or off to control operation of the pump which constitutes the supply of liquid.

The pressure from the supply of liquid which acts on the said opposite side of the second diaphragm is controlled by a sensing unit, for example a levelling valve, which is responsive to changes in the loading on the vehicle which alter the ride height.

The second diaphragm may be located in a housing in which the pressure chamber and the working chamber are defined. Alternatively, the second diaphragm may be located in a housing which is separate from the housing in which the pressure chamber is defined, and the two housings on the sides of the diaphragms remote from the pressure chamber and the supply of liquid are interconnected by an external connection. In such a construction the working chamber is defined by the external connection and the parts of the two housings which are disposed between the two diaphragms. In fact more than one housing containing a pressure chamber and damping valve means can be connected to a common housing containing the second diaphragm through a corresponding number of external connections.

Our invention is particularly applicable for use with hydro-pneumatic suspension units of the kind in which the pressure chamber is located at an end of a housing for connection to the chassis or frame of the vehicle and the opposite end is closed by a flexible rolling diaphragm which is connected at its peripheral edge to the housing and at substantially its centre of area is coupled to a plunger responsive to movement of a wheel or axle relative to the chassis or frame. In operation oscillations of the rolling diaphragm which acts on the plunger are damped by the effect of liquid in the working chamber tending to be forced through the damping valve means.

Figure 2:
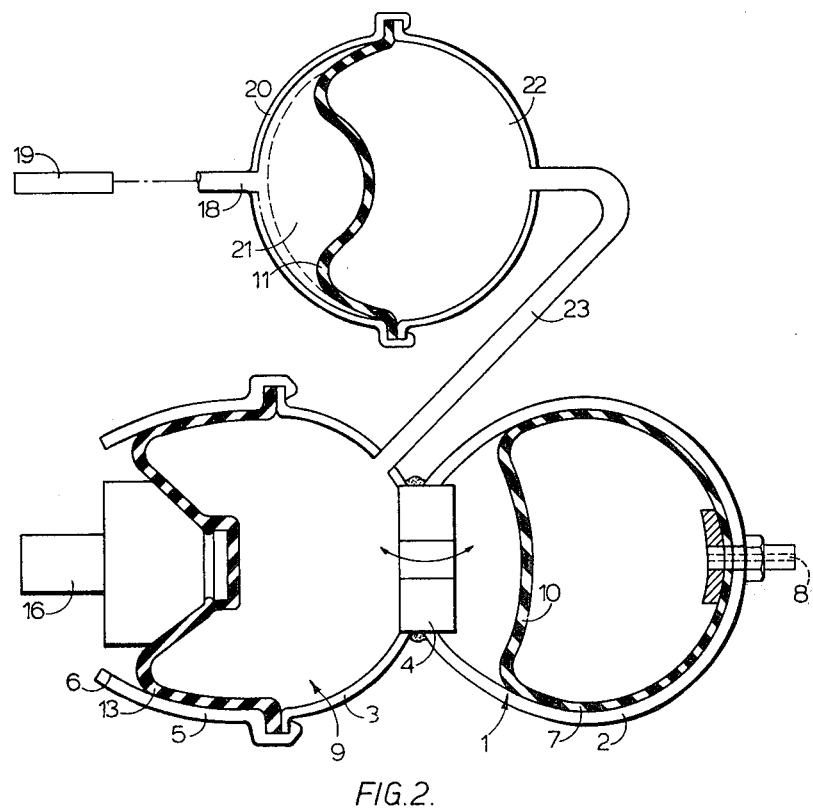

Two embodiments of our invention are illustrated in the accompanying drawings in which:

FIG. 1 is a longitudinal section through an hydro-pneumatic suspension unit for a vehicle; and FIG. 2 is a longitudinal section of an hydro-pneumatic suspension unit similar to that of FIG. 1 in combination with separate height adjusting means.

The hydro-pneumatic suspension unit illustrated in FIG. 1 of the drawings comprises a housing 1 constituted by a substantially spherical shell 2 which is connected to a hemi-spherical shell 3 by means of a casing 4 containing oppositely acting one-way valves or restrictors for damping liquid flow between the two shells 2, 3. A third shell 5 having an inner face 6 of arcuate outline is connected at its peripheral edge to the peripheral edge of the shell 3.

A closed flexible membrane 7 is housed within the shell 2, and the membrane 7 defines a pressure chamber which is filled with gas under pressure through a filler 8.

A working chamber 9 is defined in the housing 1 between a thickened wall of the membrane 7, which constitutes a first diaphragm 10, and a second diaphragm 11 on the opposite side of the casing 4 and which, at its peripheral edge, is clamped between mating faces of the shells 3 and 5. The working chamber 9 is filled with liquid under pressure through an external connection 12.

A third rolling diaphragm 13, which closes the open end of the third shell 5, is clamped at its peripheral edge, also between mating faces of the shells 3 and 5, and rolls in an outward direction over the face 6. At sustantially the mid-point in its area the rolling diaphragm 13 is coupled to the free end of a plunger 16 of frusto-conical outline.

A height adjusting chamber 17 defined between the diaphragms 11 and 13 is supplied with liquid under pressure from a source of high pressure liquid, suitably a pump driven by the prime mover of the vehicle, through an inlet 18.

In a vehicle the housing 1 is connected to the chassis or frame, the plunger 16 is connected to a wheel or an axle, and liquid is admitted to the chamber 17 under the control of load sensing means, suitably a levelling valve 19, which is arranged to maintain the separation between sprung and unsprung parts of the vehicle within predetermined limits, thereby maintaining the ride height substantially at a predetermined value, irrespective of changes in the loading on the vehicle. Specifically increase in the loading will compress the gas in the pressure chamber 7 and, to compensate for a corresponding reduction in the ride height, further liquid is admitted into the height adjusting chamber 17. Similarly upon decrease in the loading and a reduction in the pressure in the pressure chamber 7, the levelling valve 19 is operative to exhaust liquid from the chamber 17.

During normal operation, the unit operates in a conventional manner with rolling movement of the diaphragm 13 over the surface 6 in response to oscillations between the chassis or frame and the wheel or axle being damped by the flow of liquid in the working chamber against the resistance to flow of the valves or restrictions in the casing 4.

In the modified construction of FIG. 2 the second diaphragm 11 is housed within and divides a separate spherical casing 20 into a height adjusting chamber 21 and to a chamber 22. The chamber 21 is connected to the pressure supply through the connection 18. The chamber 22 is connected through an external connection 23 to, and forms a part of, the working chamber 9, which is also defined between the diaphragms 10 and 13.

This has the advantage that a single height adjusting chamber 21 can be utilised, by a corresponding number of external connections, to compensate for changes in vehicle loading on any convenient number of suspension units. For example one height adjusting chamber 21 can compensate for changes in the lengths of the suspension units of a pair of front wheels of a vehicle.

The construction and operation of the arrangement illustrated in FIG. 2 is otherwise the same as that of FIG. 1, and corresponding reference numerals have been applied to corresponding parts.

I claim:

1. Hydro-pneumatic suspension means for a vehicle comprising in combination a housing assembly and a piston member, said housing assembly and said piston member being adapted for connection between sprung and unsprung parts of a vehicle and being relatively movable in response to relative movement between the sprung and unsprung parts, wherein the housing assembly incorporates a pressure chamber containing a trapped volume of gas under pressure which defines a gas spring for supporting the load on a wheel or axle of the vehicle, a working chamber containing a trapped constant volume of liquid, a height adjusting chamber to which liquid is supplied to compensate for changes in the pressure in the pressure chamber due to changes in the loading on the vehicle, a first flexible diaphragm for separating said gas in said pressure chamber from said liquid in said working chamber, a second flexible diaphragm for separating said trapped volume of liquid in said working chamber from any liquid in said height adjusting chamber so that no transfer of liquid between said working chamber and said adjusting chamber can take place, a third diaphragm disposed between said piston member and said housing assembly and through which oscillations between said piston member and said housing assembly are transmitted to said gas spring by displacement of said liquid in said working chamber, and damping valve means separate from said piston member and disposed within said working chamber, said liquid in said working chamber being forced through said valve means to damp out oscillations of said gas spring in response to relative movement between the sprung and unsprung parts, and wherein a supply of liquid of which the pressure can be altered to compensate for changes in the pressure in said pressure chamber due to changes in the loading on the vehicle is provided for supply to said height adjusting chamber, whereby a ride height for the vehicle can be maintained substantially at a constant value.

2. An hydro-pneumatic suspension means as claimed in claim 1, incorporating a sensing unit which is responsive to changes in the loading of the vehicle for controlling the pressure from said supply of liquid which acts on the said opposite side of said second diaphragm.

3. An hydro-pneumatic suspension means as claimed in claim 1, wherein said pressure chamber is defined in a first housing, said second diaphragm is located in a second housing which is separate from said first housing, and an external connection is provided for interconnecting said first and second housings on the sides of said diaphragms remote from said pressure chamber and said supply of liquid.

4. An hydro-pneumatic suspension means as claimed in claim 3, wherein said working chamber is defined by said external connection and parts of said first and second housings which are disposed between said first and second diaphragms.

5. An hydro-pneumatic suspension means as claimed in claim 1, wherein said housing assembly is open at one end and is provided with means for connection to the chassis or frame of the vehicle, and said third diaphragm comprises a flexible rolling diaphragm which has a peripheral edge sealingly connected to said housing to close said one end and a centre of area, and a plunger responsive to movement of a wheel or axle relative to the chassis or frame is coupled to said rolling diaphragm substantially at said centre of area.

* * * * *